(12) United States Patent
Mazzarolo et al.

(10) Patent No.: US 12,108,815 B2
(45) Date of Patent: Oct. 8, 2024

(54) GARMENT PROVIDED WITH AN INFLATABLE PROTECTIVE DEVICE AND ASSOCIATED METHOD FOR ADJUSTING OPERATIONAL MODES OF THE INFLATABLE PROTECTIVE DEVICE

(71) Applicant: Alpinestars Research S.p.A., Maser (IT)

(72) Inventors: Giovanni Mazzarolo, Coste di Maser (IT); Marco Signorelli, Albignasego (IT)

(73) Assignee: ALPINESTARS RESEARCH S.P.A., Maser (IT)

( * ) Notice: Subject to any disclaimer, the term of this patent is extended or adjusted under 35 U.S.C. 154(b) by 1012 days.

(21) Appl. No.: 16/965,494

(22) PCT Filed: Jan. 30, 2019

(86) PCT No.: PCT/EP2019/052212
§ 371 (c)(1),
(2) Date: Jul. 28, 2020

(87) PCT Pub. No.: WO2019/149737
PCT Pub. Date: Aug. 8, 2019

(65) Prior Publication Data
US 2021/0052024 A1    Feb. 25, 2021

(30) Foreign Application Priority Data

Feb. 2, 2018   (IT) .................. 102018000002348

(51) Int. Cl.
*B60N 2/00*    (2006.01)
*A41D 13/015*  (2006.01)
(Continued)

(52) U.S. Cl.
CPC ....... *A41D 13/0155* (2013.01); *A41D 13/018* (2013.01); *G05B 15/02* (2013.01);
(Continued)

(58) Field of Classification Search
CPC .............. A41D 13/0155; A41D 13/018; A41D 2600/102; G05B 15/02; G06F 3/02;
(Continued)

(56) References Cited

U.S. PATENT DOCUMENTS

| 8,662,528 B1 | 3/2014 | Abdulaziz |
| 9,648,914 B2 | 5/2017 | Duncan et al. |

(Continued)

FOREIGN PATENT DOCUMENTS

| CN | 103201166 A | 7/2013 |
| CN | 104394724 A | 3/2015 |

(Continued)

OTHER PUBLICATIONS

PCT International Search Report and Written Opinion dated Mar. 22, 2019 for Intl. App. No. PCT/EP2019/052212, from which the instant application is based, 10 pgs.

(Continued)

*Primary Examiner* — Tiffany P Young
(74) *Attorney, Agent, or Firm* — FREDRIKSON & BYRON, P.A.

(57) ABSTRACT

A garment comprising an inflatable protective device. The inflatable protective device includes at least one inflatable bag, an inflator unit designed for inflating the at least one inflatable bag, sensors designed for monitoring the user's body for detecting shocks or unexpected movements, and a control unit designed for processing the data provided by the sensors and for activating the inflator unit if, on the basis of the data received by the sensors, a danger situation is identified. The control unit includes storing means contain- (Continued)

ing at least two different setup parameter sets and/or firmwares of the control unit for controlling the activation of the inflator unit. The control unit is further provided with selecting means for selecting one of the said at least two different setup parameter sets and/or firmwares. Also a method for adjusting the operational modes of the inflatable protective device of the garment.

21 Claims, 9 Drawing Sheets

(51) Int. Cl.
| | |
|---|---|
| A41D 13/018 | (2006.01) |
| G05B 15/02 | (2006.01) |
| G06F 3/02 | (2006.01) |
| G06F 3/0484 | (2022.01) |
| G06F 3/0488 | (2022.01) |
| G06F 11/30 | (2006.01) |
| G08B 21/02 | (2006.01) |
| B60N 2/02 | (2006.01) |
| B60R 21/01 | (2006.01) |

(52) U.S. Cl.
CPC .............. *G06F 3/02* (2013.01); *G06F 3/0484* (2013.01); *G06F 3/0488* (2013.01); *G06F 11/3058* (2013.01); *G08B 21/0269* (2013.01); *A41D 2600/102* (2013.01); *B60N 2/0276* (2013.01); *B60R 21/01* (2013.01); *B60R 2021/01013* (2013.01); *B60R 2021/01027* (2013.01); *B60R 2021/0104* (2013.01); *B60R 2021/01286* (2013.01)

(58) Field of Classification Search
CPC .. G06F 3/0484; G06F 3/0488; G06F 11/3058; G08B 21/0269; B60N 2/0276; B60R 21/01; B60R 2021/01013; B60R 2021/01027; B60R 2021/0104; B60R 2021/01286

USPC ........................................................ 700/275
See application file for complete search history.

(56) References Cited

U.S. PATENT DOCUMENTS

| | | | |
|---|---|---|---|
| 2005/0067816 | A1 | 3/2005 | Buckman |
| 2007/0147272 | A1* | 6/2007 | Mazzarolo ........... A41D 13/018 |
| | | | 370/280 |
| 2008/0176539 | A1 | 7/2008 | Staton et al. |
| 2015/0173433 | A1* | 6/2015 | Mazzarolo ........... A41D 13/018 |
| | | | 2/463 |

FOREIGN PATENT DOCUMENTS

| | | | | |
|---|---|---|---|---|
| CN | 106659255 | A | 5/2017 | |
| JP | 2006201942 | A | 8/2006 | |
| JP | 2009280099 | A | 12/2009 | |
| KR | 101016611 | B1 | 2/2011 | |
| WO | 2005077213 | A1 | 8/2005 | |
| WO | 2008050290 | A2 | 5/2008 | |
| WO | 2012034185 | A1 | 3/2012 | |
| WO | 2014047341 | A1 | 3/2014 | |
| WO | WO-2015019261 | A1 * | 2/2015 | ............. A41D 1/002 |
| WO | 2015028947 | A1 | 5/2015 | |
| WO | 2016012359 | A1 | 1/2016 | |
| WO | 2016132255 | A1 | 8/2016 | |
| WO | 2018002341 | A1 | 1/2018 | |

OTHER PUBLICATIONS

Dainese "D-Air Street Use and Maintenance Manual" Published Nov. 30, 2012, p. 216.
Dainese, "Dainese How to: D-Air Street (Vest)" Youtube, https://www.youtube.com/watch?v=OvuBhxCTsHg, Published Jun. 22, 2016.
European Patent Office "Preliminary Opinion of the Opposition Division in charge of the examination of the opposition filed against EP19101389.9" from EP Application No. 19701389.9, Dated Jun. 26, 2024, p. 17.
Merriam-Webster "Defintion of Rides", from https://www.merriam-webster.com/dictionary/rides, retrieved Apr. 24, 2023, p. 16.

* cited by examiner

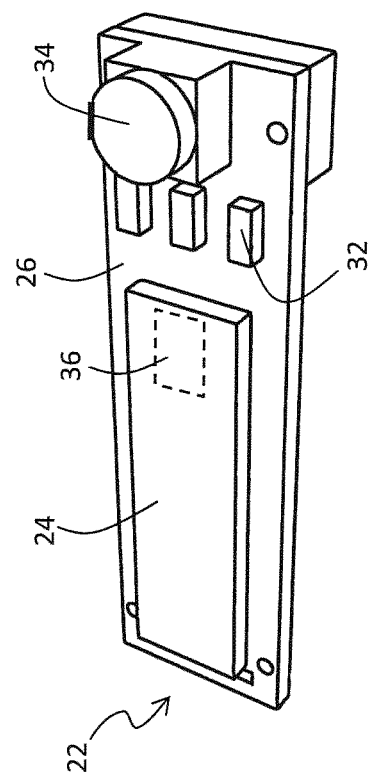
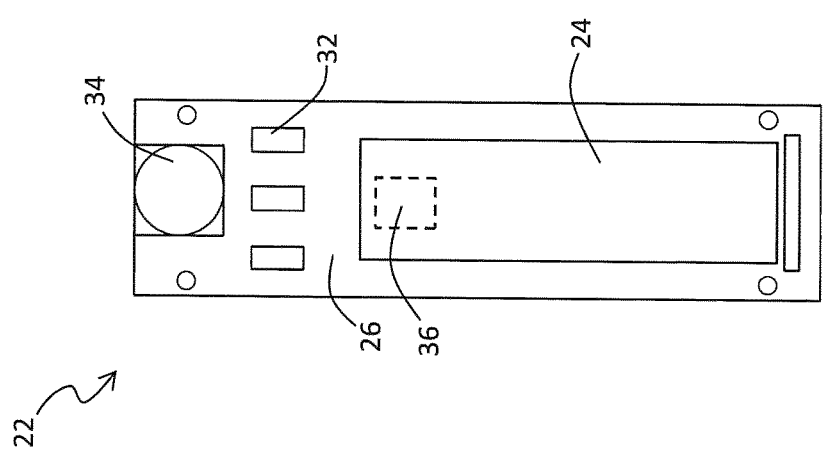
Fig. 6
Fig. 5

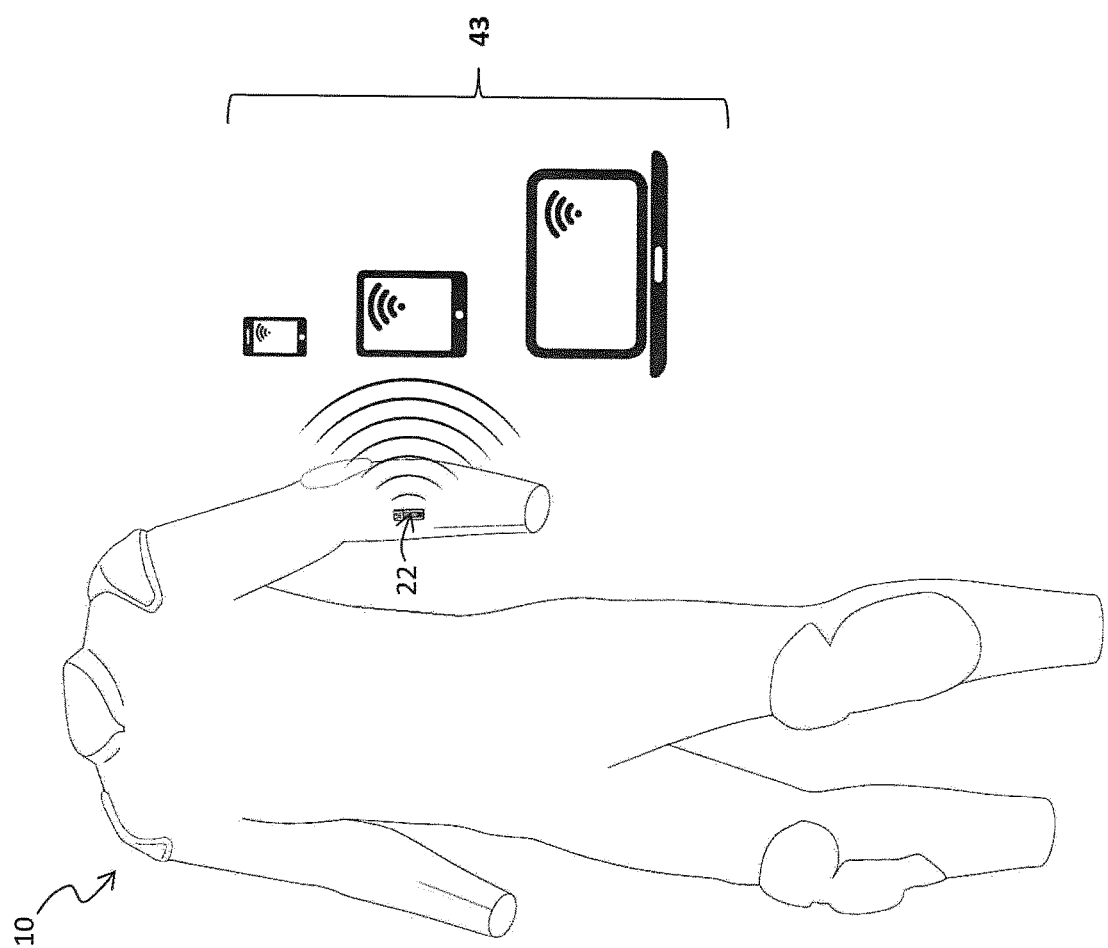

GARMENT PROVIDED WITH AN INFLATABLE PROTECTIVE DEVICE AND ASSOCIATED METHOD FOR ADJUSTING OPERATIONAL MODES OF THE INFLATABLE PROTECTIVE DEVICE

RELATED APPLICATIONS

This application is a 35 U.S.C. 371 national stage filing from International Application No. PCT/EP2019/052212, filed Jan. 30, 2019, which claims priority to Italian application No. 102018000002348, filed Feb. 2, 2018, the teachings of which are incorporated herein by reference.

FIELD OF THE INVENTION

The present invention relates to a garment provided with an inflatable protective device and to an associated method for adjusting operational modes of the inflatable protective device. In particular, the present invention refers, even if in a non-exclusive way, to a garment suitable for being worn by a motorcyclist.

BACKGROUND

Recently, the protection offered to motorcyclists in case of an accident or a fall has been improved thanks to protective garments provided with inflatable protective devices.

These inflatable protective devices consist of one or more inflatable bags, commonly called airbags, arranged in the areas of the user body more prone to injuries in case of an accident, for example, back, neck, chest, hip, etc.

The inflation of the airbags is managed by a control unit which controls one or more sensors applied to the garment in order to detect and evaluate a crash occurrence.

If a danger is detected, the control unit is designed for sending an activation signal to an inflator unit, connected to the inflatable bags, so as to inflate the inflatable bags.

The input data received from the sensors are processed by the control unit through dedicated algorithms that govern the inflation triggering decision.

Extensive researches have been carried out on such algorithms, giving the control unit the ability to distinguish different types of crashes and different riding conditions. Nowadays specific algorithms have been developed for racing use, as well as for street use or even off-road use of the garment, etc.

Typically, during the racing use of the garment, low-side and high-side crashes are involved. A low-side crash is when, following to a loss of traction, the motorbike and the rider slide across the asphalt. A high-side crash is when, following to an unexpected movement of the motorbike, the rider is thrown into the air over the handlebars.

Conversely, during the street use of the garment, collisions are the most typical event.

Moreover, due to the high speed and high accelerations/decelerations involved, generally in racing use the threshold above which the control unit interprets the data detected by the sensors as a danger situation is higher with respect to the street use.

Furthermore, in case the control unit is set up for street use, if the garment is used in a circuit, the inflatable protective device could be too sensitive to specific movements of the user caused by the riding in a circuit, for example higher speed, higher lean angle, higher accelerations, etc., with the risk to interpret normal riding events as dangerous.

Similarly, in case the control unit is set up for racing use, if the garment is used during a road transfer, the inflatable protective device could be less sensitive to specific movements of the user caused for example by a collision with other vehicles or with obstacles.

Airbag activation specificity is generally introduced into the control unit by firmware programming, hence by installing the dedicated algorithm.

It is known to update the control unit byway of a substitution of an algorithm designed for controlling the activation of the airbag in a first riding condition, for example in racing use, with an algorithm designed for controlling the activation of the airbag in a different riding condition, for example in street use.

However, the substitution of the various algorithms is preferably carried out by connecting the control unit of the garment to a personal computer and overwriting the installed firmware with a new one.

As a consequence, only one activation firmware is installed on the control unit.

In view of this, the change among one or more firmwares specific for street use of the garment and one or more firmwares specific for racing use of the garment cannot be immediate. Moreover, since the control unit is generally positioned in a protected area of the garment, the update preferably should be carried out when the garment is no longer worn by the user, otherwise it would not be easy to have access to the control unit.

BRIEF SUMMARIES OF OBJECTS OF THE INVENTION

The object of tie present invention is to provide a garment with an inflatable protective device, which solves at least partly the above mentioned problems and drawbacks.

In particular, an aim of the present invention is to provide a garment with an inflatable protective device, able to be easily changed among different operational modes according to different riding conditions.

Moreover, an aim of the present invention is to provide a garment with an inflatable protective device, wherein the changing among different operational modes can be carried out in an automatic way.

Furthermore, an aim of the present invention is to provide a garment with an inflatable protective device, wherein the changing among different operational modes can be carried out by using a wireless connection.

Additionally, an aim of the present invention is to provide a garment with an inflatable protective device able to assure an optimal level of protection during different modes of use.

Finally, an aim of the present invention is to provide a method for changing among different operational modes a garment provided with an inflatable protective device.

These and other objects and aims are achieved by the garment according to claim 1 and by the method according to claim 15.

BRIEF-DESCRIPTIONS OF THE DRAWINGS

The advantages and the characteristic features of the invention will appear more clearly from the following description of preferred, but not exclusive, embodiments of the garment with reference to the accompanying figures in which:

FIG. 5 is similar to FIG. 3, but referring to a different embodiment;

FIG. 6 shows a front perspective view of the element of FIG. 5;

FIG. 12 shows schematically a possible connection between a garment according to the present invention and different smart portable devices.

With reference to the attached figures, an example of a garment according to the invention is indicated as a whole by the reference 10. Said garment 10 is suitable for being used in particular by motorcycle riders. Nevertheless, as it will appear more clearly from the following description, the garment 10 can also be advantageously used by cyclists, skiers or in other fields where the same garment can be used in different outer conditions or modes.

DETAILED DESCRIPTION OF EMBODIMENTS OF THE INVENTION

Figure 2:
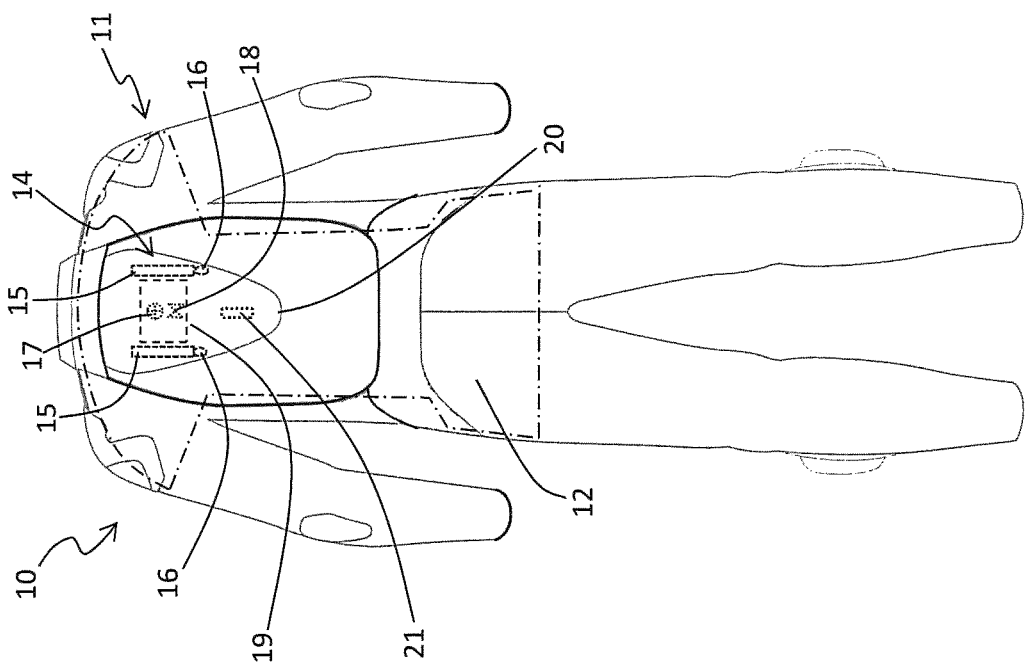
FIG. 2 shows a rear view of the garment of FIG. 1.
Figure 1:
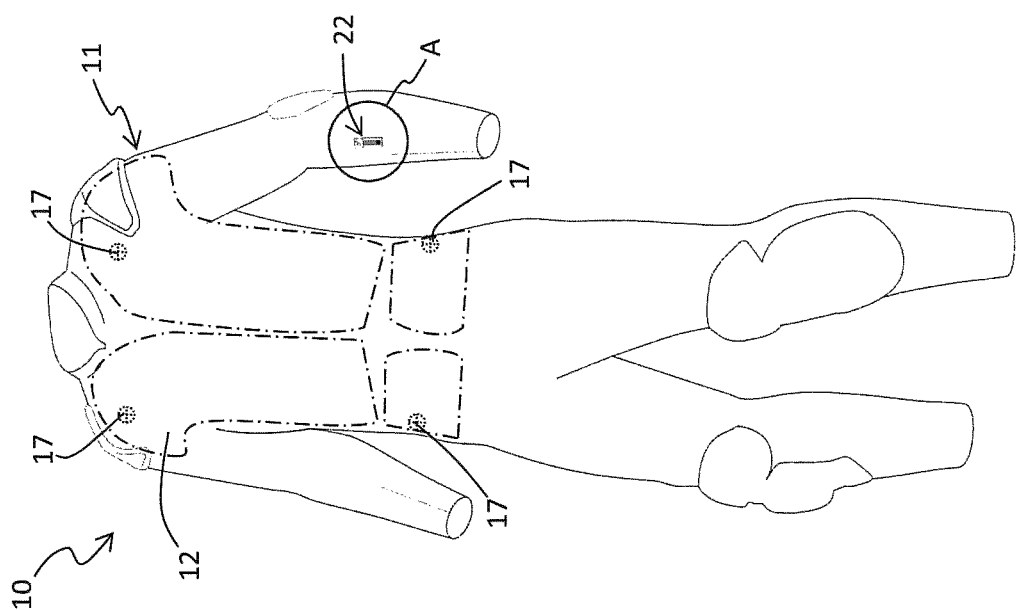
FIG. 1 shows a front view of a garment according to the present invention.

In FIGS. 1-2 a one-piece suit is shown. However, a garment according to the present invention can be manufactured as a jacket or a vest, preferably made with a material resistant to abrasion.

Alternatively, a garment according to the present invention can be manufactured as an undergarment, designed for being worn underneath an outer protective garment.

The garment 10 comprises an inflatable protective device 11.

The inflatable protective device 11 comprises at least one inflatable bag 12, suitable for moving between a rest condition, wherein it is deflated, and an operating condition, wherein it is inflated.

The inflatable protective device 11 also comprises an inflator unit 14 for the inflation of the inflatable bag 12.

According to the embodiment of FIGS. 1 and 2, the inflator unit 14 comprises two gas generators 15, preferably provided at the back portion of the garment 10.

Each gas generator 15 preferably comprises a gas generating material designed for being activated by a corresponding igniter 16 so as to generate a sufficient quantity of gas to inflate the inflatable bag 12.

The inflatable protective device 11 also comprises sensors 17, 18 designed for monitoring the user body for detecting shocks or unexpected movements.

According to the embodiment of FIGS. 1 and 2, the garment 10 comprises six sensors 17, 18 preferably distributed at the shoulder area, at the hip area and at the back area. Preferably said sensors are accelerometers 17 or gyroscopes 18.

According to the embodiment of FIGS. 1 and 2, an accelerometer 17 and a gyroscope 18 are provided at the back portion of the garment 10.

Different arrangements and quantities of the sensors 17, 18 are possible in order to meet other specific needs.

The inflatable protective device 11 also comprises a control unit 19. As would be appreciated from the foregoing description, the control unit is a controller. The control unit 19 is suitable for processing the data provided by the sensors 17, 18 in order to identify a danger situation.

If a danger situation is identified by the control unit 19, the latter sends an activation signal to the inflator unit 14 so as to inflate the inflatable bag 12.

In particular, when the control unit 19 detects that, on the basis of the data received by the sensors 17, 18, a danger situation is occurring, the control unit 19 provides ignition current to the igniter 16. Upon receipt of ignition current, the igniter 16 immediately ignites the gas generating material of the gas generator 15, causing the inflatable bag 12 to move from its rest condition to its operating condition.

As shown in the embodiment of FIGS. 1 and 2, the control unit 19 and the inflator unit 14 are preferably housed in a protection 20 arranged at the back portion of the garment 10. Preferably said protection 20 has an ergonomic and aerodynamic shape. One or more sensors 17, 18 can also be housed inside said protection 20.

Advantageously, inside the protection 20 also the battery 21 for supplying electric power to the various components of the inflatable protective device 11 might be housed.

In a further embodiment the control unit 19 and the inflator unit 14 may be integrated in a back protector of the user, eliminating in that case the need for the external protection element 20.

According to the invention, the control unit 19 comprises storing means 25 containing at least two different setup parameter sets and/or firmwares 29 of the control unit 19 for controlling the activation of the inflator unit 14.

The control unit 19 is further provided with selecting means 31 for selecting one of the at least two different setup parameter sets and/or firmwares 29 (see FIG. 9), so that the behavior of the inflatable protective device 11 changes according to the selected setup parameter set and/or firmware.

Advantageously, according to the invention, it is possible to have a protective garment for motorcyclist where, for example, crash detection algorithms for racing use and street use are simultaneously installed in the control unit 19 so as to be varied according to the different riding conditions. In this way, the user can be provided with a protective garment 10 wherein the algorithm of activation of the inflatable protective device 11 is best suited according to the use of the garment.

Different firmwares can contain different algorithms or same firmware can operate by means of different setup parameter sets (for example, threshold of activation).

Preferably, the storing means 25 comprise at least two data storage memories 33, 35.

In a first data storage memory 33 the common parameters dealing with the overall functionality of the control unit 19 can be installed.

Preferably, the parameters installed in the first data storage memory 33 deals with the boot code that is needed to initialize the control unit 19 and related hardware or with the finite state machine of the system where all main functions are coded.

Advantageously, the specific parameters of each setup parameter set and/or each firmware 29 can be installed in a second data storage memory 35.

In this way the updating of the specific setup parameter sets or of the firmwares 29 can be operated by acting only on the second data storage memory 35 lowering the risk of degrading the common parts of the setup parameter sets or firmwares 29 installed on the first data storage memory 33.

The selecting means 31 can be manually and/or automatically operable.

In case the selecting means are manually operable, the user is able to control the selecting means 31 of the control unit 19 for selecting one of the different firmwares and/or setup parameter sets 29 by performing a predefined action.

In case the selecting means are automatically operable, the control unit 19, without needing any user's action, will autonomously control the selecting means 31 so as to select, on the basis of predefined conditions, one of the different firmwares and/or setup parameter sets 29.

In case the selecting means 31 are manually and automatically operable, the user is able to modify, if it is needed, the firmware and/or setup parameter set automatically selected by the control unit 19.

The inflatable protective device 11 can comprise a user interface 34 suitable for providing input commands to the control unit 19.

The user by means of the user interface 34 can advantageously perform the predefined actions needed for selecting one of different firmwares and/or setup parameter sets 29 installed on the control unit 19.

Preferably, the user interface 34 is a button or a switch provided at the outer surface of the garment 10, in a position which is easily reachable by the user.

Alternatively, the user interface 34 can be a touch sensing device, like for example a touch screen operable by the user through his fingers or a touch control pen. This device is not shown in the attached figures being well known to a skilled person.

Advantageously, by pressing the button 34, sliding the switch 34 or acting on the touch screen, the user will be able to perform the selection between the different firmwares and/or the different setup parameter sets 29, by changing the control unit 19, for example, from a racing intended use to a street intended use and vice versa.

In detail, the action performed by the user through the user interface 34 sends an identification signal to the control unit 19 which, by means of the selecting means 31, executes the firmware and/or the setup parameter set 29 corresponding to the identification signal received.

The identification signal can correspond to a pressing action of the button which for example can be hold for an amount of seconds to execute a given action or can correspond to a sliding of the switch between two different positions.

Alternatively, the identification signal can correspond to a finger touch on a specific icon of the display panel of the touch screen.

Figure 9:
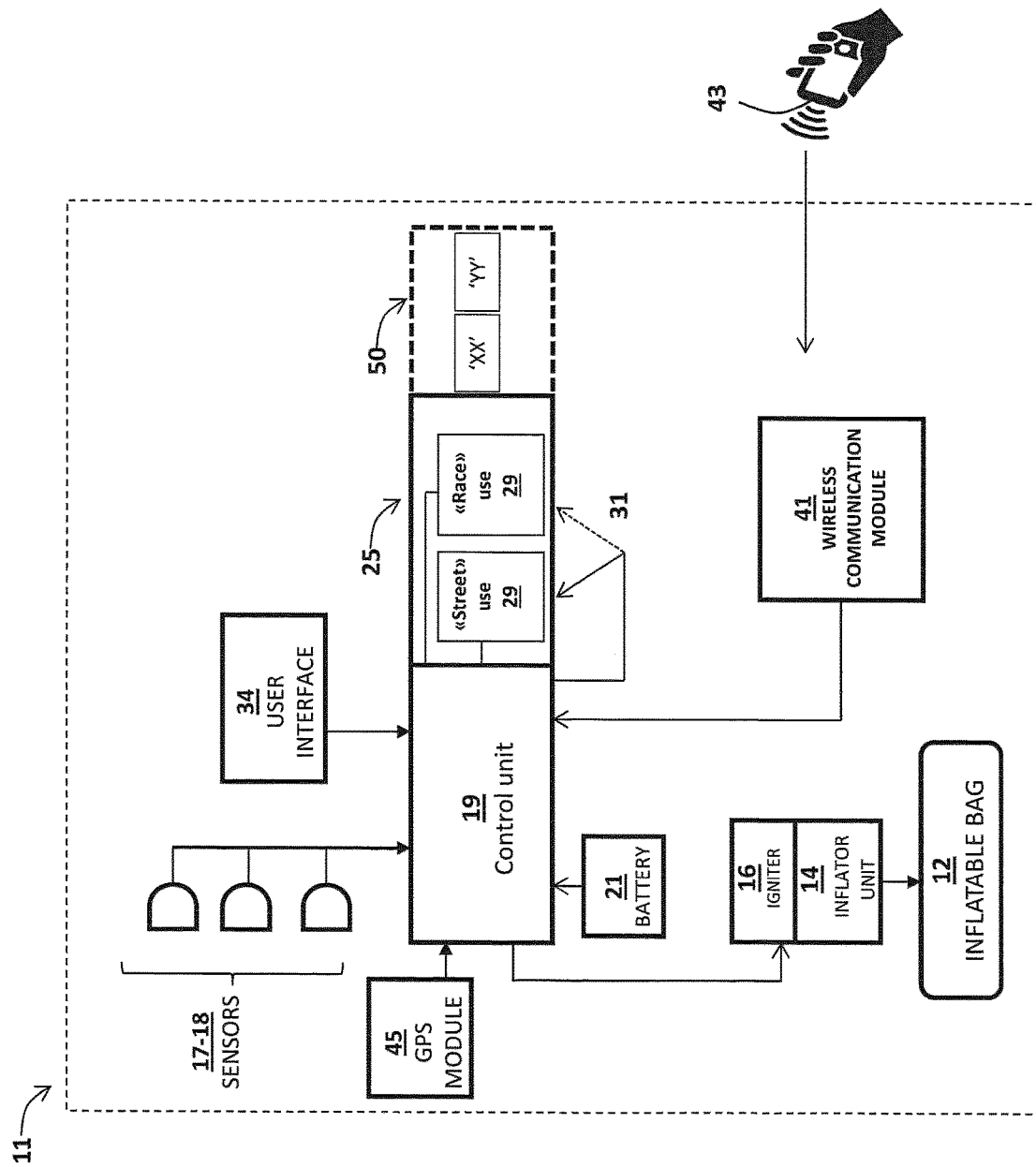
FIG. 9 shows a schematic block diagram of the inflatable protective device of the garment according to the invention.

Advantageously, the inflatable protective device 11 can be provided with a wireless communication module 41 suitable for communicating with a corresponding wireless communication module of a smart portable device 43, for example a smartphone, a tablet or a portable PC (see FIGS. 9 and 12).

Preferably the wireless communication modules of the inflatable protective device 11 and the smart portable device 43 are Bluetooth modules, WiMAX modules, 3G modules, HSPA or LTE modules.

Advantageously, the smart portable device 43 can comprise a dedicated software application by means of which the user is able to operate on the control unit 19 of the protective inflatable device 11.

In particular, after having established the pairing between the control unit 19 and the smart portable device 43, through the communication between the corresponding wireless communication modules, the user is advantageously able to perform the selection between the different firmwares and/or the different setup parameter sets 29 using the software application running on the smart portable device 43.

Figure 11:
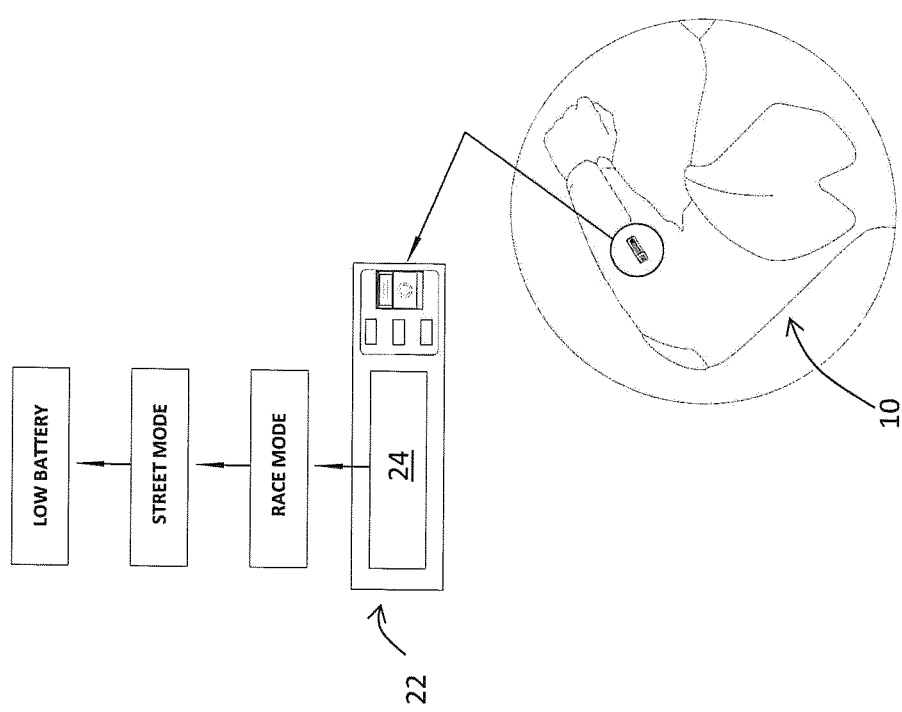
FIG. 11 shows schematically some examples of the information that can be displayed on the display unit of the garment according to the present invention.

Advantageously, the inflatable protective device 11 can be provided with a display unit 22 which comprises an alphanumeric and/or graphical visual display 24 for providing the user with messages and/or symbols about the internal status of the inflatable protective device 11 (see FIGS. 1 and 11).

A display unit 22 of this type is disclosed in the Italian Patent Application n° 102016000068775, in the name of the same applicant.

Advantageously, the display unit 22 can comprise at least one signaling device 32, for example a LED light. Preferably, the signaling device 32 is provided on top of the PCB ("printed circuit board") 26 of the display unit 22 (see FIGS. 3-6).

Preferably the display unit 22 is positioned on a sleeve of the garment 10. However, different positioning of the display unit 22 can be easily imagined according to specific needs.

Advantageously, the display unit 22 by means of the visual display 24 is able to provide information about the status of each component of the inflatable protective device 11. For example, the alphanumeric and/or graphical visual display 24 is able to provide the user with visual information about the status of the sensors 17, 18, the inflator unit 14, the control unit 19, the status of the battery 21 and about the battery charge level.

As shown in FIG. 11, preferably the visual display 24 is also able to provide the user with information about the setting of the control unit, namely which firmware and/or setup parameter set 29 of the control unit 19 is currently selected.

For example, according to FIG. 11, a message "RACE MODE" or "STREET MODE" can be displayed on the visual display 24 according to the riding conditions set up by the user.

Advantageously, the user interface 34 can be integrated in the display unit 22.

Figure 4:
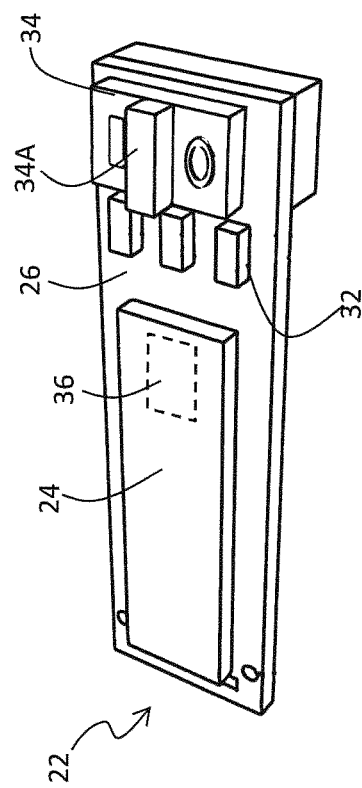
FIG. 4 shows a front perspective view of the element of FIG. 3.
Figure 3:
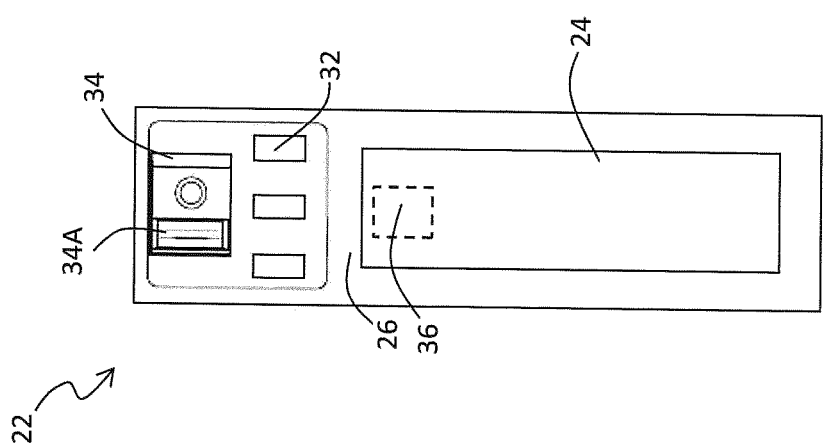
FIG. 3 shows an enlarged view of the detail A of FIG. 1.

According to the embodiment of FIGS. 3 and 4, the user interface 34 consists in a slide switch 34 provided on the display unit 22, preferably on the top surface of the PCB 26 of the display unit 22.

The slide switch 34 can comprise a movable slider 34A, movable for example from a first position to a second position and vice versa.

By moving the slider 34A, the user is able to change the set-up of the control unit according to the different riding conditions.

Similarly, according to the embodiments of FIGS. 5 and 6, the user interface consists in a button 34 provided on the display unit 22, preferably on the top surface of the PCB 26 of the display unit 22.

Advantageously the user interface 34 can also consist in a touch sensing device provided on the display unit 22.

Advantageously, by holding the button 34 for a first predetermined period of time, for example 5 seconds, or by holding and releasing the button 34 for a prefixed number of time, for example at least three times for less than 3 seconds, the control unit 19 can be entered in the configuration status, so that the user can select the firmware and/or the setup parameter set 29 more adapted to his needs by choosing between the settings at his disposal.

In this case, the settings at disposal of the user will be displayed on the visual display 24 preferably in the form of a sliding menu.

In order to accomplish this task, the display unit 22 preferably comprises a microprocessor 36 which is provided with a decoding system for decoding the inputs provided by the user by means of the interface 34 and for displaying on the visual display 24 a corresponding message or menu.

Figure 7:
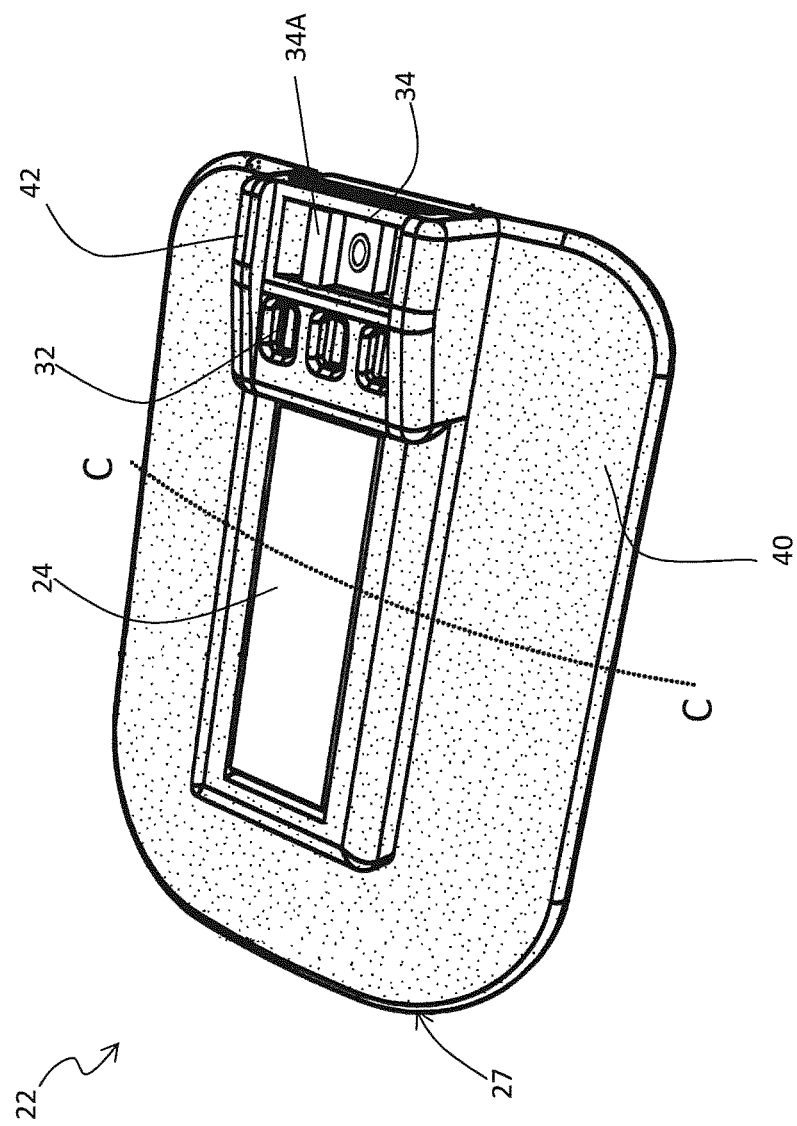
FIGS. 7-8 shows front perspective views of different embodiments of the detail A of FIG. 1.
Figure 8:
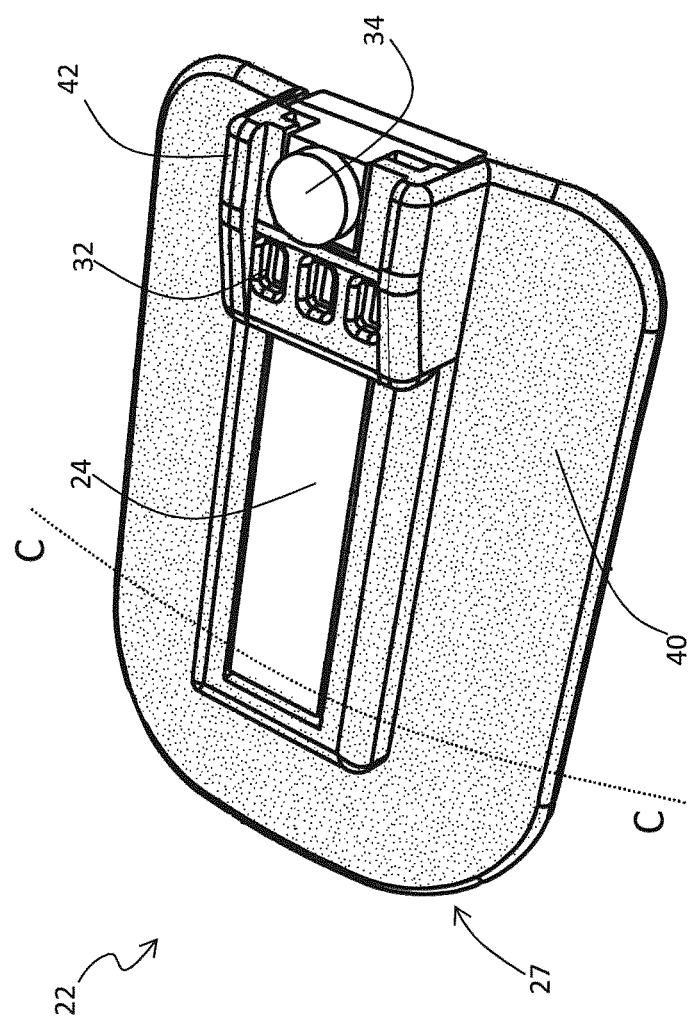

As shown in FIGS. 7 and 8, the display unit 22 can be inserted in a protective housing 27 which comprises a fastening margin 40 and protection walls 42 for the user interface 34.

Advantageously, the display unit 22 is removably housed inside the protective housing 27.

Figure 10:
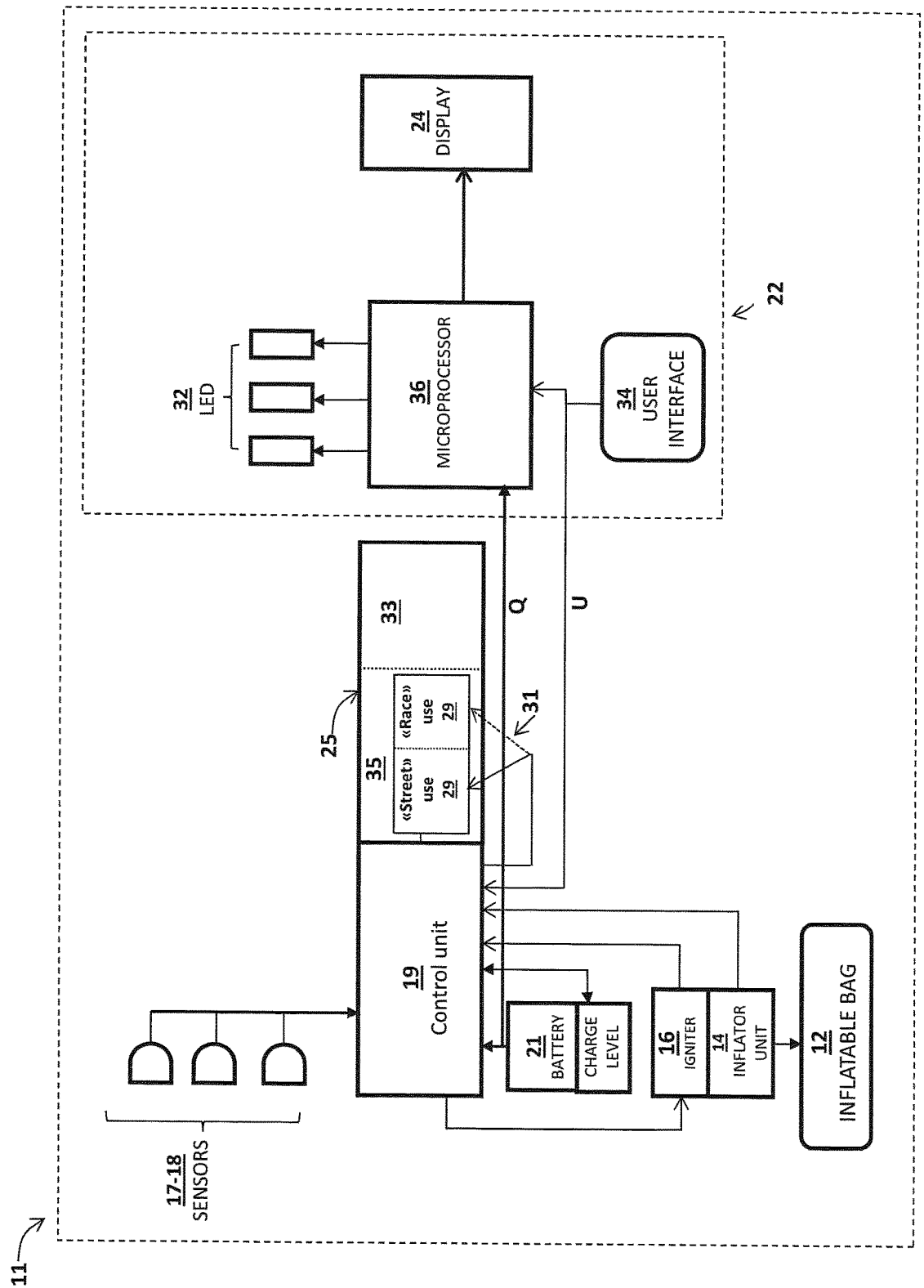
FIG. 10 shows a schematic block diagram of the inflatable protective device, provided with a display unit, of a garment according to the present invention.

According to FIG. 10, the display unit 22 can be connected to the control unit 19 by means of a line Q which allows the transmission of data and power between the control unit 19 and the microprocessor 36.

In detail, by means of the line Q the battery 21 can be connected to the microprocessor 36 and the control unit 19. Advantageously, the line Q can comprise two wires accommodated inside a single cable. This considerably reduces the cost of the line.

The transmission of data and power can be carried out adapting well known standard serial power-line communication protocols, like X10 or UPB.

Moreover, a further data line U can be dedicated for sending to the control unit 19 a signal when the user interface 34 is used by the user, so that the control unit 19 is able to receive the signal even if the display unit 22 is switched off. In this way the user's input can be transmitted both to the control unit 19 and the microprocessor 36.

As anticipated, by acting on the user interface 34 the user is able to select by means of the selecting means 31 one of the firmwares and/or setup parameter sets 29 stored in the storing means 25.

Advantageously, the selecting means 31 can also be automatically operable. In this case, the control unit 19 can autonomously control the selecting means 31, without needing any user's action, so as to select, on the basis of predefined conditions, one of the different firmwares and/or different setup parameter sets 29 stored in the storing means 25.

The automatic changing between different firmwares and/or different setup parameter sets 29 is preferably notified to the user, for example by changing the indication of LED's 32 or by displaying a message on the visual display 24 or by sending a notification to the smart portable device 43 paired with the garment 10.

A first predefined condition for changing between different operation modes can be linked, for example, to a specific geo-location of the garment.

A second predefined condition can be based, for example, on a real-time analysis of the user riding style (e.g., average speed, lean angle patterns, etc. . . . ).

Obviously, different predefined conditions can be set up in order to meet other specific needs.

With reference to the above mentioned first predefined condition, the inflatable protective device 11 is preferably connected to a GPS module 45 suitable for receiving a plurality of positional information.

Advantageously, the GPS module 45 can be provided on the garment 10, for example in the protection 20 arranged at the back portion of the garment 10, the GPS module 45 being directly connected to the control unit 19 (for example, see FIG. 9).

Alternatively, the GPS receiver of the smart portable device 43 paired with the control unit 19 can be used as GPS module 45.

At the same time, a database 'XX' of specific geo-locations, for example geo-locations of race tracks, can be stored in an additional memory 50 of the control unit 19. Alternatively, the database 'XX' can be stored in the storing means 25.

Advantageously, each specific geo-location of the database 'XX' is matched with one of the firmwares and/or setup parameter sets 29 stored in the storing means 25.

The control unit 19 can be configured to continuously compare the positional information received by the GPS module 45 with the geo-locations database 'XX' stored in the additional memory 50 or in the storing means 25.

When the control unit 19, on the basis of the received positional information, identifies that the garment 10 is situated in proximity of one of the specific geo-locations stored in the additional memory 50 or in the storing means 25, the control unit will be advantageously able to autonomously operate the selecting means 31, so as to select the firmware and/or the setup parameter set 29 associated with that specific geo-location.

For example, in case the database 'XX' stored in the storing means 25 or in the additional memory 50 concerns geo-locations of race tracks, the control unit 19 when the user is entering in a race track will select the firmware and/or the setup parameter set 29 associated with that specific race track.

With reference to the above mentioned second predefined condition, a database 'YY' of specific sets of data, each set identifying a different riding style, can be stored in the additional memory 50 or in the storing means 25 of the control unit 19. Such data can include average speed, lean angle patterns, longitudinal and transversal deceleration or acceleration, etc.

The control unit 19 can be configured to continuously compare the data provided by the sensors 17, 18 of the garment 10 with the sets of data stored in the database 'YY'.

When the control unit 19, on the basis of the received data, identifies that the user is riding the motorbike with a style that corresponds for example to a racing style, which involves high speed, high lean angles, hard accelerations and/or decelerations, the control unit 19 will be advantageously able to autonomously operate the selecting means 31, so as to select the firmware and/or the setup parameter set 29 more suited for that riding style.

Advantageously, the control unit 19 can operate the selecting means 31 also on the basis of a combination of predefined conditions. For example, each of the above mentioned predefined conditions can be used in combination with other predefined conditions to add redundancy or can be used as a standalone alternative.

In order to avoid false positives and to avoid the selection of a not best suited firmware or setup parameter set 29, the control unit 19 can autonomously operate the selecting means 31 at the end of a monitoring period.

For example, in case the control unit 19, on the basis of the received positional information, identifies that the user is entering in a race track, the control unit 19 can activate a monitoring period, in order to have the confirmation that the rider is actually riding inside the track area and not on a street in close proximity to the race track.

In this case, during the monitoring period, the control unit 19 can further analyze the positional information received by the GPS module 45 in order to verify for example whether repeated sequences of positional information can be found. Such repeated sequences are indicative that the rider is riding along a circuit.

For example, a monitoring period can correspond to the time needed to the user for covering two laps of the circuit.

Alternatively, the control unit 19 can analyze the data received by the sensors 17, 18 in order to verify whether the detected speed, accelerations and lean angle correspond to a riding style typical of racing.

At the expiration of the monitoring period, if the control unit 19, on the basis of the additional data detected, has the confirmation that the rider is riding on a circuit, it will operate the selecting means for selecting the firmware and/or the setup parameter set 29 best suited for that riding style among the various firmwares and/or setup parameter sets at its disposal.

At the same time an alert is prompted to the rider.

Similarly, a monitoring period can be activated even if the control unit 19, on the basis of the data received by sensors 17, 18 identifies the riding style of the user as a racing style.

Also in this case the control unit 19 can analyze for a period of time the data received by the sensors 17, 18 in order to verify whether repeated sequences of data can be found.

At the expiration of the monitoring period, for example two or three minutes, if the control unit 19, on the basis of the additional data detected, has the confirmation that the rider is riding according to a racing style, it will operate the selecting means for selecting for example the race mode between the various parameters at its disposal.

Similarly, a monitoring period can be set up by the control unit 19 when the latter, by comparing the positional information received by the GPS module 45 with the geolocations 'XX' stored in the storing means 25 or in the additional memory 50, identifies that the rider is going out from the race track.

To avoid false positives, for example when the rider is in the paddock area, the control unit 19 can still monitor for a prefixed duration of time the positional information received by the GPS module 45 or the data detected by the sensors 17, 18.

When the control unit 19 has the confirmation that the rider is detected in movement and away from the race track, the control unit 19 can operate the selecting means for selecting for example the street mode use at the end of the monitoring period.

Alternatively, the monitoring period can be ended after the rider has covered a predefined path, for example 2 kilometers.

Also in this case, an alert is prompted to the rider.

At this point it is clear how the predefined objects may be achieved with the garment 10 and the method for changing among different firmwares and/or different setup parameter sets according to the invention.

As a matter of fact, the garment according to the present invention is provided with an inflatable protective device whose activation can be set up easily according to different riding conditions and different uses.

As a matter of fact, the rider can change the control unit from a firmware and/or setup parameter set designed for racing riding condition to a firmware and/or setup parameter set designed for street riding condition by simply acting on a user interface of the garment or on a smart portable device paired with the garment.

At the same time, the changing among different modes of use can be carried out automatically so as to overcome possible oversights of the rider offering to him, in every circumstance, the best level of safety.

Moreover, the various firmwares and/or the various setup parameter sets installed on the control unit 19 of the inflatable protective device can be easily updated without having the risk to damage the functioning of the inflatable protective device.

With regard to the embodiments of the garment 10 and the method for changing among different firmwares and/or different setup parameter sets described above, the person skilled in the art may, in order to satisfy specific requirements, make modifications to and/or replace elements described with equivalent elements, without thereby departing from the scope of the accompanying claims.

The invention claimed is:

1. A protective garment for motorcycle riders comprising an inflatable protective device, the inflatable protective device comprising:
at least one inflatable bag suitable for moving between a rest condition, wherein it is deflated, and an operating condition, wherein it is inflated;
an inflator unit designed for inflating the at least one inflatable bag;
sensors designed for monitoring the user's body;
a control unit designed for processing the data provided by the sensors and for activating the inflator unit if, on the basis of the data received by the sensors, a danger situation is identified;
characterized in that the control unit comprises storing means containing at least two different setup parameter sets and/or firmwares of the control unit for correspondingly controlling activation of the inflator unit in at least two different riding conditions, the control unit being further provided with selecting means for selecting one of the at least two different setup parameter sets and/or firmwares according to one of the at least two different riding conditions, the control unit configured to send an activation signal to the inflator unit so as to inflate the at least one inflatable bag in said at least two differing riding conditions, if a danger situation is detected by the control unit.

2. The protective garment according to claim 1, characterized in that the selecting means are manually and/or automatically operable.

3. The protective garment according to claim 1, characterized in that the storing means comprise at least two data storage memories.

4. The protective garment according to claim 3, characterized in that in a first data storage memory common parameters dealing with the overall functionality of the control unit are installed, specific parameters of each of the at least two different setup parameter sets and/or firmwares being installed on a second data storage memory.

5. The protective garment according to claim 1, characterized in that the inflatable protective device comprises a user interface suitable for sending an identification signal to the control unit which, by means of the selecting means, executes the setup parameter set and/or firmware corresponding to the received identification signal.

6. The protective garment according to claim 1, characterized in that the inflatable protective device is provided with a display unit which comprises an alphanumeric and/or graphical visual display for providing messages and/or symbols about which setup parameter set and/or firmware of the control unit is selected.

7. The protective garment according to claim 5, characterized in that the user interface is integrated in a display unit comprising an alphanumeric and/or graphical visual display for providing messages and/or symbols about which setup parameter set and/or firmware of the control unit is selected, the user interface being a slide switch or a button or a touch sensing device provided on the display unit.

8. The protective garment according to claim 1, characterized in that the inflatable protective device is provided with a wireless communication module suitable for communicating with a corresponding wireless communication module of a smart portable device, the selection of one of said at least two different setup parameter sets and/or firmwares being operated by means of the smart portable device.

9. The protective garment according to claim 1, characterized in that the control unit autonomously controls the selecting means so as to select, on the basis of predefined conditions, one of said at least two different setup parameter sets and/or firmwares.

10. The protective garment according to claim 1, characterized in that the inflatable protective device is connected to a GPS module suitable for receiving a plurality of positional information, a database of specific geo-locations being stored in an additional memory or in the storing means of the control unit, each specific geo-location of the database being matched with one of said at least two different setup parameter sets and/or firmwares.

11. The protective garment according to claim 10, characterized in that the control unit is configured to compare the positional information received by the GPS module with the geo-locations of the database, the control unit being able to identify when the garment is situated in proximity of one of the specific geo-locations of the database so as to autonomously operate the selecting means for selecting the setup parameter set and/or firmware associated with said specific geo-location.

12. The protective garment according to claim 1, characterized in that a database of specific sets of parameters, each set identifying a riding style, is stored in an additional memory or in the storing means of the control unit.

13. The protective garment according to claim 12, characterized in that the control unit is configured to compare the data provided by the sensors with the sets of parameters of database, the control unit being able to autonomously operate the selecting means for selecting the setup parameter set and/or firmware more suited with the riding style identified by the database.

14. The protective garment according to claim 13, characterized in that the control unit autonomously operates the selecting means after expiration of a monitoring period, wherein the control unit verifies if repeated sequences are found in the data provided by the sensors.

15. The protective garment according to claim 11, characterized in that the control unit autonomously operates the selecting means after expiration of a monitoring period, wherein the control unit verifies if repeated sequences are found in the positional information received by the GPS module.

16. A method for adjusting the operational modes of a protective garment for motorcycle riders comprising an inflatable protective device, the inflatable protective device comprising:
   at least one inflatable bag suitable for moving between a rest condition, wherein it is deflated, and an operating condition, wherein it is inflated;
   an inflator unit designed for inflating the at least one inflatable bag;
   sensors designed for monitoring the user's body;
   a control unit designed for processing the data provided by the sensors and for activating the inflator unit if, on the basis of the data received by the sensors, a danger situation is identified;
   wherein the control unit comprises storing means containing at least two different setup parameter sets and/or firmwares of the control unit to correspondingly control activation of the inflator unit in at least two different riding conditions, the control unit being further provided with selecting means for selecting one of the said at least two different setup parameter sets and/or firmwares according to one of the at least two differing riding conditions;
   said method adjusting the operational modes of the inflatable protective device according to conditions of use of the protective garment, the method comprising the steps of:
      receiving a selection signal according to the riding condition;
      selecting, among said at least two different setup parameter sets and/or firmwares of the control unit of the inflatable protective device, the setup parameter set and/or the firmware corresponding to the received selection signal; and
      sending an activation signal to the inflator unit so as to inflate the at least one inflatable bag in said at least two differing riding conditions, if a danger situation is detected by the control unit.

17. The method according to claim 16, characterized in that the selection step is automatically executed.

18. The method according to claim 17, characterized in that the selection signal is provided by comparing positional information received by a GPS module with a database of specific geo-locations and in that the selecting step is carried out by selecting, among the setup parameter sets and/or firmwares of the control unit, the setup parameter set and/or the firmware associated with the identified geo-location of the database.

19. The method according to claim 17, characterized in that the selection signal is provided by comparing data provided by sensors of the inflatable protective device with a database of specific sets of parameters, each set identifying a riding style, and in that the selecting step is carried out by selecting, among the setup parameter set and/or firmwares of the control unit, the setup parameter set and/or firmware more suited with the riding style identified by the database.

20. The method according to claim 16, characterized in that the selection step is manually executed.

21. The method according to claim 20, characterized in that the selection signal is provided by performing a predefined action on a user interface of the garment and in that the selecting step is carried out by selecting, among the setup parameter sets and/or firmwares of the control unit, the setup parameter and/or firmware associated with said predefined action.

* * * * *